United States Patent
Jeong et al.

(10) Patent No.: US 8,554,213 B2
(45) Date of Patent: *Oct. 8, 2013

(54) APPARATUS AND METHOD FOR PERFORMING CELL SELECTION TO HOME CELL OR PRIVATE NETWORK IN A MOBILE COMMUNICATION SYSTEM

(75) Inventors: Kyeong-In Jeong, Gyeonggi-do (KR); Gert Jan Van Lieshout, Middlesex (GB); Soeng-Hun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,600

(22) Filed: Aug. 3, 2012

(65) Prior Publication Data
US 2012/0295616 A1 Nov. 22, 2012

Related U.S. Application Data (60) Division of application No. 13/270,832, filed on Oct. 11, 2011, which is a continuation of application No. 12/015,182, filed on Jan. 16, 2008, now Pat. No. 8,036,656.

(30) Foreign Application Priority Data

Jan. 16, 2007 (KR) .................. 10-2007-0004900

(51) Int. Cl.
*H04W 4/00* (2009.01)
(52) U.S. Cl.
USPC ............................ 455/434; 455/436; 370/332

(58) Field of Classification Search
None
See application file for complete search history.

(56) References Cited

U.S. PATENT DOCUMENTS 6,131,029 A 10/2000 Roberts
(Continued)

FOREIGN PATENT DOCUMENTS

| JP | 2003-518889 | 6/2003 |
| JP | 2001-507539 | 6/2011 |

(Continued)

OTHER PUBLICATIONS

ETSI: "Universal Mobile Telecommunications System (UMTS); UE Procedures in Idle Mode and Procedures for Cell Reselection in Connected Mode (3GPP TS 25.304 version 3.5.0 Release 1999)", ETSI TS 125 304 V3.5.0, Dec. 1, 2000.

*Primary Examiner* — Erika A Washington
(74) *Attorney, Agent, or Firm* — The Farrell Law Firm, P.C.

(57) ABSTRACT

An apparatus and method for performing cell selection to a Home cell or a Private network in a mobile communication system are provided, in which a User Equipment (UE) determines a candidate cell by measuring a serving cell and neighbor cells, receives an indicator indicating a Home cell or a Private network in system information from the candidate cell, determines whether the candidate cell is included in a Home cell or Private network list set in the UE, and selects the candidate cell if the candidate cell is included in the Home cell or Private network list.

32 Claims, 9 Drawing Sheets

(56) References Cited

U.S. PATENT DOCUMENTS

| | | |
|---|---|---|
| 6,430,414 B1 | 8/2002 | Sorokine et al. |
| 6,516,193 B1 | 2/2003 | Salmela et al. |
| 6,529,491 B1 | 3/2003 | Chang et al. |
| 6,542,742 B2 | 4/2003 | Schramm et al. |
| 8,036,656 B2 | 10/2011 | Jeong et al. |
| 8,340,669 B2 * | 12/2012 | Jeong et al. .................. 455/434 |
| 2001/0046879 A1 | 11/2001 | Schramm et al. |
| 2002/0111166 A1 | 8/2002 | Monroe |
| 2006/0291427 A1 | 12/2006 | Park |
| 2008/0171538 A1 | 7/2008 | Naito et al. |

FOREIGN PATENT DOCUMENTS

| | | |
|---|---|---|
| RU | 2 277 762 | 6/2006 |
| WO | WO 98/39940 | 9/1998 |
| WO | WO 2004/114691 | 12/2004 |
| WO | WO 2005/094111 | 10/2005 |
| WO | WO 2009/001269 | 12/2008 |

* cited by examiner

APPARATUS AND METHOD FOR PERFORMING CELL SELECTION TO HOME CELL OR PRIVATE NETWORK IN A MOBILE COMMUNICATION SYSTEM

PRIORITY

This application is a Divisional Application of U.S. application Ser. No. 13/270,832 filed in the U.S. Patent and Trademark Office on Oct. 11, 2011, which is Continuation Application of U.S. application Ser. No. 12/015,182, now U.S. Pat. No. 8,036,656, which was filed in the U.S. Patent and Trademark Office on Jan. 16, 2008, and claims priority under 35 U.S.C. §119(a) to a Korean Patent Application filed in the Korean Intellectual Property Office on Jan. 16, 2007 and assigned Ser. No. 10-2007-0004900, the content of each of which is incorporated herein by reference.

BACKGROUND OF THE INVENTION

1. Field of the Invention

The present invention relates generally to a mobile communication system, and more particularly to an apparatus and method for performing cell selection to a Home cell or a Private network such that only a specific User Equipment (UE) can access the Home cell or the Private network in a mobile communication system including public cells.

2. Description of the Related Art

Universal Mobile Telecommunications Systems (UMTS) is a $3^{rd}$ Generation (3G) asynchronous mobile communication system operating in Wideband Code Division Multiple Access (WCDMA), based on European mobile communication systems, Global System for Mobile Communications (GSM) and General Packet Radio Services (GPRS).

The $3^{rd}$ Generation Partnership Project (3GPP) that standardized UMTS is now discussing Long Term Evolution (LTE) as the next generation of UMTS, Evolved UMTS.

The 3GPP LTE is a technology for enabling packet communications at or above 100 Mbps, aiming at commercialization by the year 2010.

For deploying the LTE system, many communication schemes have been proposed. Among them are schemes for reducing the number of nodes on a communication line by simplifying a network configuration or for optimizing radio protocols for radio channels.

Figure 1:
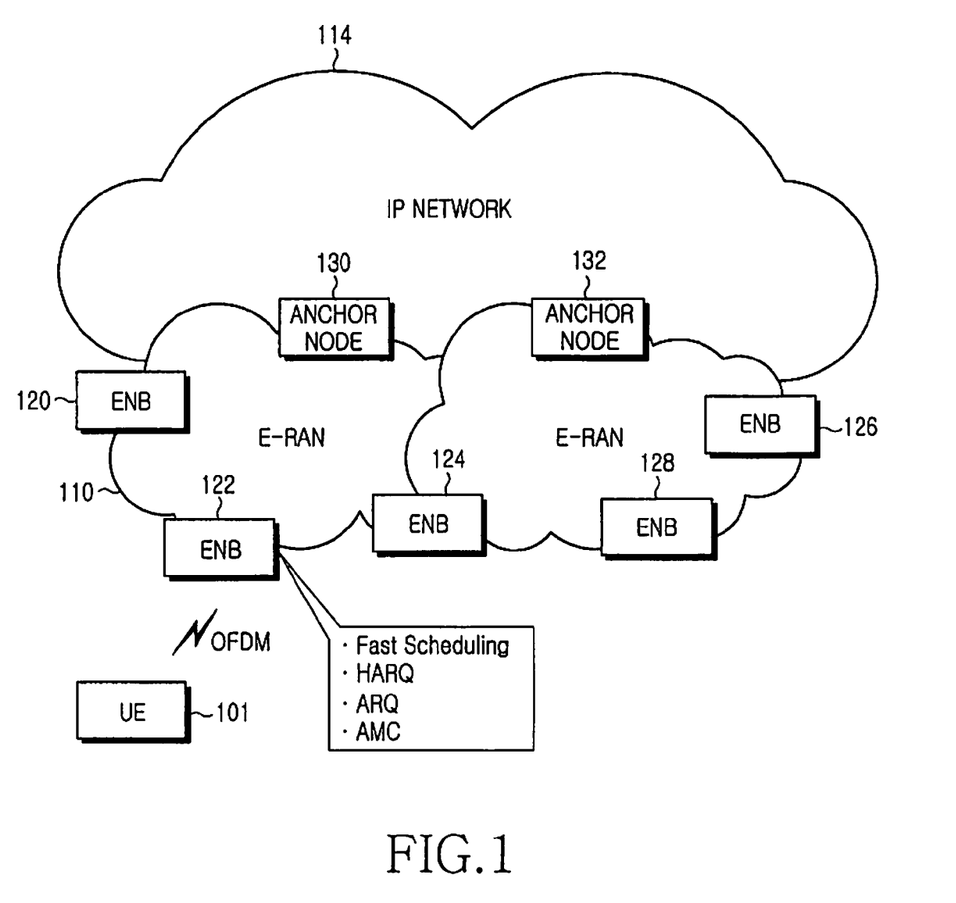
FIG. 1 illustrates the configuration of a 3GPP LTE system to which the present invention is applied.

FIG. 1 illustrates an Evolved UMTS mobile communication system to which the present invention is applied.

Referring to FIG. 1, an Evolved UMTS Radio Access Network (E-UTRAN) 110 is simplified to a 2-node structure including Evolved Node Bs (ENBs) 120, 122, 124 and an anchor node 130, or ENBs 126 and 128 and an anchor node 132.

A UE 101 is connected to an Internet Protocol (IP) network via the E-UTRAN 110. The ENBs 120 to 128 correspond to legacy Node Bs in the UMTS system and are connected to the UE 101 via radio channels. Compared to the legacy Node Bs, the ENBs 120 to 128 handle more complex duties in the system.

For example, since all user traffic including real-time service such as Voice Over IP (VoIP) is serviced on shared channels in the 3GPP LTE, an entity for collecting the status information of UEs and scheduling them is required and the ENBs 120 to 128 are responsible for the scheduling. Generally, an ENB controls a plurality of cells and performs Adaptive Modulation and Coding (AMC) by selecting a modulation scheme and a channel coding rate for a UE adaptively according to the channel status of the UE.

As with High Speed Downlink Packet Access (HSDPA) and High Speed Uplink Packet Access (HSUPA) in UMTS, or Enhanced Dedicated CHannel (EDCH), the LTE system will use Hybrid Automatic Repeat reQuest (HARQ) between the ENBs 120 to 128 and the UE 101.

Considering that a variety of Quality of Service (QoS) requirements cannot be fulfilled with HARQ, a high layer may perform an outer ARQ between the UE 101 and the ENBs 120 to 128. HARQ is a technique for increasing reception success rate by soft-combining previous received data with retransmitted data without discarding the previous data. High-speed packet communication systems such as HSDPA or EDCH use HARQ to increase transmission efficiency.

To realize a data rate of up to 100 Mbps, it is expected that the LTE system will adopt Orthogonal Frequency Division Multiplexing (OFDM) in a 20-MHz bandwidth as a radio access technology.

To differentiate services from the legacy UMTS system, the 3GPP LTE standard working group is considering using the Home cell or Private network for the LTE system. The Home cell or Private refers to a cell or a network that provides services only to a specific UE or UE Groups.

However, a cell (re)selection method for applying the Home cell or the Private network is yet to be specified and mentioned. Therefore, conventional methods of the legacy UMTS system for cell selection associated with movement of a UE are not viable in a mobile communication system where the Home cell or the Private network co-exist with macro cells (hereinafter public cells), because the conventional cell selection methods do not involve the concept of the Home cell or the Private network, as previously stated.

Another problem with the conventional cell selection in the communication system having the Home cell or the Private network together with the public cells is that all UEs consider the Home cell or the Private network to be identical in a public cell and performs cell selection by a conventional measurement. Accordingly, there exists a need for a more detailed cell selection method, considering the existence of the Home cell or the Private network in the LTE system.

SUMMARY OF THE INVENTION

An aspect of the present invention is to address at least the problems and/or disadvantages and to provide at least the advantages described below. Accordingly, an aspect of the present invention is to provide a method and apparatus for cell selecting to a specific cell as the Home cell or the Private network that only a specific UE or UE group can access the specific cell in a communication system that co-exists with public cells.

Another aspect of the present invention is to provide a method and apparatus of a UE for selecting to the Home cell or the Private network by distinguishing the Home cell or the Private network from public cells in a communication system that co-exists with public cells.

In accordance with the present invention, there is provided a method for performing cell selection to a Home cell or a Private network in a UE in a mobile communication system, in which a candidate cell is determined by measuring a serving cell and neighbor cells, an indicator indicating a Home cell or a Private network is received in system information from the candidate cell, a determination is made as to whether the candidate cell is included in a Home cell or Private network list set in the UE, and the candidate cell is selected if it is included in the Home cell or Private network list.

In accordance with the present invention, there is provided a method for performing cell selection to a Home cell or a Private network in a UE in a mobile communication system in which a neighbor cell list is received, the system including at least one neighbor cell with an offset in system information from a serving cell, the offset indicating a Home cell or a Private network, the neighbor cell with the offset is extracted, a determination is made as to whether the extracted neighbor cell is included in a Home cell or Private network list, the offset is added to a measurement of the extracted neighbor cell and the extracted neighbor cell is selected as a candidate cell if the extracted neighbor cell is included in the Home cell or Private network list, system information is received from the candidate cell, and the candidate cell is selected.

In accordance with the present invention, there is provided an apparatus of a UE for performing cell selection to a Home cell or a Private network in a mobile communication system, in which a measurer determines a candidate cell by measuring a serving cell and neighbor cells, an indicator analyzer receives an indicator indicating a Home cell or a Private network in system information from the candidate cell, an accessibility decider determines whether the candidate cell is included in a Home cell or Private network list set in the UE, and a cell re-selection decider selects the candidate cell if the candidate cell is included in the Home cell or Private network list.

In accordance with the present invention, there is provided an apparatus of a UE for performing cell selection to a Home cell or a Private network in a mobile communication system, in which a neighbor cell list receives a neighbor cell list including at least one neighbor cell with an offset in system information from a serving cell, the offset indicating a Home cell or a Private network, an extractor extracts the neighbor cell with the offset, an accessibility decider determines whether the extracted neighbor cell is included in a Home cell or Private network list, and a cell re-selection decider adds the offset to a measurement of the extracted neighbor cell and selects the extracted neighbor cell as a candidate cell if the extracted neighbor cell is included in the Home cell or Private network list, receives system information from the candidate cell, and selects the candidate cell.

BRIEF DESCRIPTION OF THE DRAWINGS

The above and other objects, features and advantages of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

While preferred embodiments of the present invention are described in the context of the 3GPP LTE system evolved from the 3GPP UMTS system, it is to be understood that the present invention is also applicable to other mobile communication systems where a UE performs cell (re)selection through UE measurement scheme.

The preferred embodiments of the present invention put forth a mobile communication environment and system that support a dedicated and specialized service to a specific UE or a specific UE group by introducing the Home cell or the Private network. The preferred embodiments of the present invention also provide a method for efficiently selecting and re-selecting the Home cell or the Private network according to a service provided to a UE in a mobile communication system where the Home cell or the Private network co-exist with public cells(macro cells).

Hereinbelow, the explanation of cell selection also applies to cell re-selection. The Home cell, Private network and office network cell are types of Closed Subscriber Group (CSG) cells, which are only accessible by a specific UE or UE group. For the sake of convenience herein, the terms CSG cell, Home cell and Private network are interchangeably used.

Embodiment 1

A mobile communication system signals an indicator indicating whether a target cell is a special cell accessible only to at least one specific UE, i.e. the Home cell or the Private network in broadcast system information. If the indicator indicates the Home cell or the Private network, a UE compares cell information about the target cell with a stored special list (hereinafter accessible list) including information about at least one specific Home cell or Private network accessible only to at least one specific UE. In the presence of the target cell in the accessible list, the UE determines that the target cell is selectable or re-selectable. In the absence of the target cell in the accessible list, the UE determines that the target cell is not selectable or re-selectable.

For example, if a UE-selected Public Land Mobile Network (PLMN) is identical to a PLMN for which information is broadcasted from the target cell, the UE checks whether the accessible list includes a cell IDentifier (ID) received from the target cell. If the cell ID is unique irrespective of the PLMN, there is no need for comparing the PLMNs.

Figure 2:
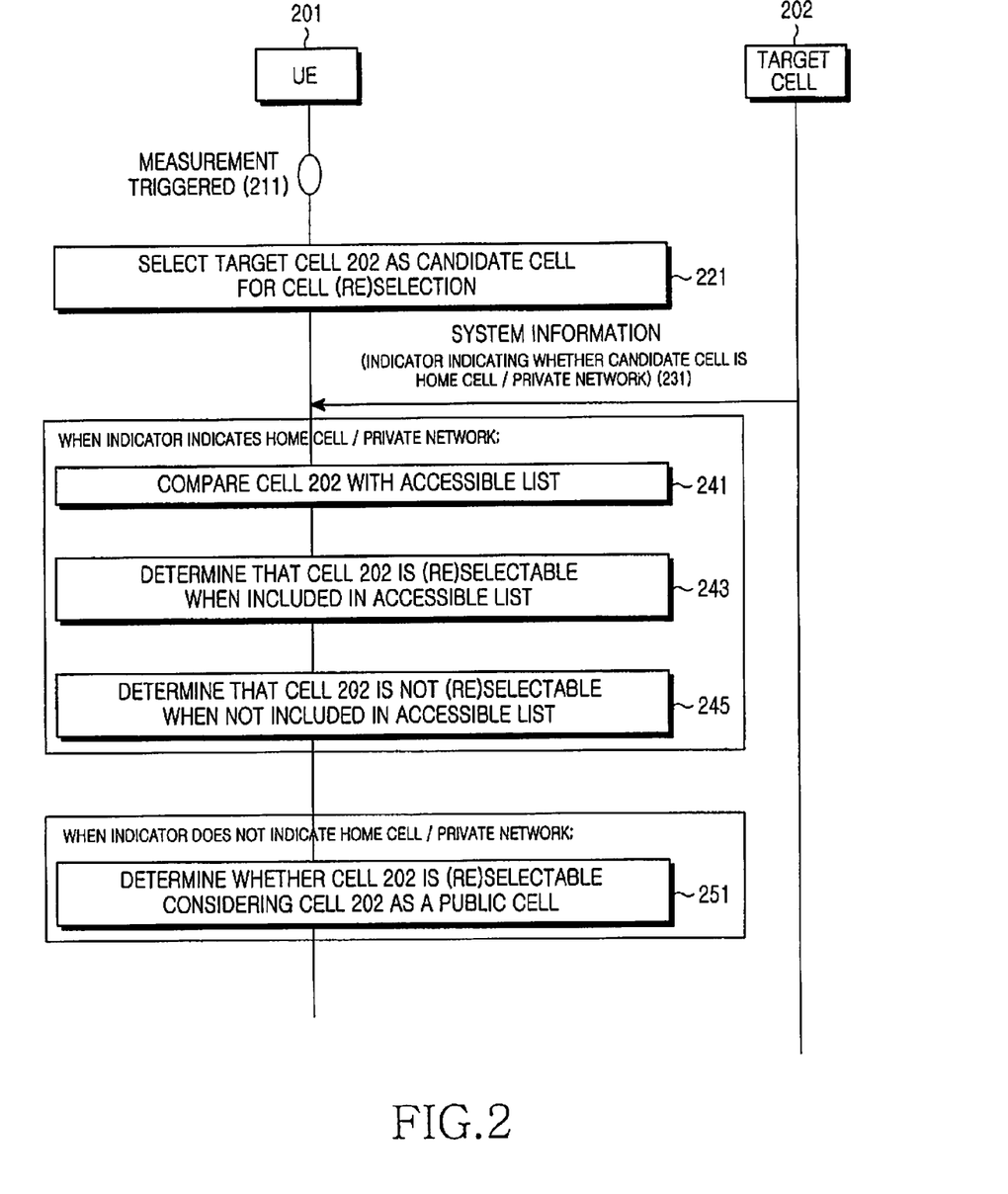
FIG. 2 illustrates a method for cell selecting to the Home cell or the Private network according to a first embodiment of the present invention.

FIG. 2 illustrates a method for cell selecting to the Home cell or the Private network according to a first embodiment of the present invention.

Referring to FIG. 2, reference numeral 201 denotes a UE and reference numeral 202 denotes a candidate (i.e. target) cell for cell selection, determined according to a measurement of the UE 201.

The UE 201 senses that a measurement has been triggered in step 211. The measurement is a process in which the UE 201 measures Primary-Common Pilot CHannels (P-CPICHs) received from a serving cell or neighbor cells and determines the radio channel conditions of the serving cell or the neighbor cells.

The measurement is triggered when the UE 201 is powered-on, the UE 201 needs to know the radio channel conditions of the neighbor cells for cell selection during movement, or the UE 201 needs to know the radio channel conditions of the serving cell or the neighbor cells periodically.

In step 221, the UE 201 selects candidate cells for cell selection according to the measurement result. In FIG. 2, one of the candidate cells is defined as a target cell 202.

When the target cell 202 is selected as a candidate cell for cell selection, the UE 201 receives system information broadcasted from the target cell 202 in step 231. The system information includes an indicator indicating whether the target cell 202 is the Home cell or the Private network that can service dedicated and specialized service to the UE or the specific UE group including the UE. If the indicator indicates that the target cell 202 is the Home cell or the Private network, the UE 201 performs steps 241, 243 and 245.

However, if the indicator does not indicate that the target cell 202 is the Home cell or the Private network, the UE 201 performs step 251.

In step 241, the UE 201 searches for the target cell 202 in the accessible list stored in the UE, wherein the accessible list includes specific information about the Home cell or the Private network.

The UE 201 may store the accessible list in a memory such as a Universal Subscriber Identity Module (USIM). The accessible list can be pre-stored by a hard coding scheme in the memory, or received from a network entity during a Tracking Area Update (TAU) procedure.

That is, in step 241, the UE 201 checks whether the target cell 202 is listed in the accessible list including the Home cell or the Private network. If the target cell 202 is listed in the accessible list, i.e. the target cell 202 is an accessible cell such as the Home cell or the Private network, the UE 201 determines that the target cell 202 is selectable in step 243. Unless otherwise restricted, the UE 201 performs cell selection to the target cell 202.

If the target cell 202 is not listed in the accessible list, the UE 201 determines that the target cell 202 is not appropriate for cell selection in step 245. Thus, the UE 201 will select another candidate cell for cell selection.

The decision as to whether the target cell 202 is included in the accessible list can be made from system information broadcasted from the target cell 202. That is, the UE 201 determines whether the cell ID of the target cell 202 in the system information is included in the accessible list. If the cell ID is unique only in a PLMN, the UE 201 should check whether a pair of the cell ID and the ID of the PLMN are included in the accessible list. It can be further contemplated that an ID other than a cell ID is used, such as a Private network ID.

Meanwhile, in step 251, the UE 201 considers that the target cell 202 is a public cell and determines whether it is a selectable cell according to a conventional cell selection manner.

Figure 3:
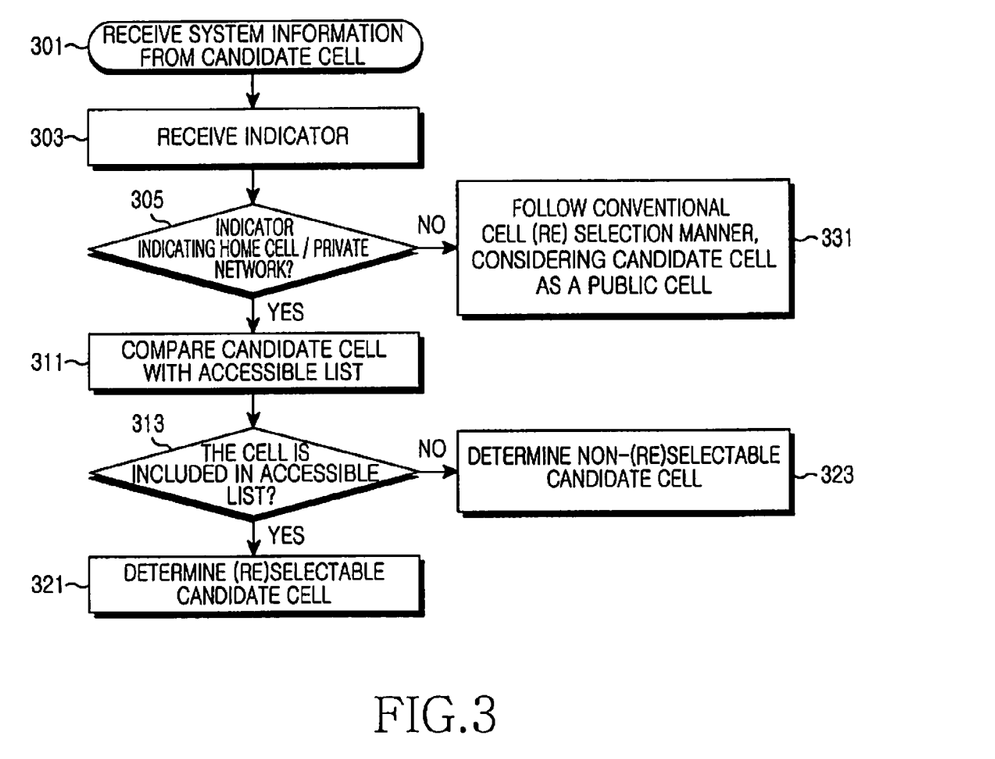
FIG. 3 is a flowchart of an operation of a UE according to the first embodiment of the present invention.

FIG. 3 is a flowchart of an operation of the UE according to the first embodiment of the present invention.

Referring to FIG. 3, when the UE powers on or moves following the UE mobility, the UE selects a candidate cell for cell selection according to the measurement result and receives system information from the candidate cell in step 301. The candidate cell can be set as a target cell to which the UE prefers to move, by cell selection.

In step 303, the UE acquires an indicator indicating whether the candidate cell is a special cell accessible only to the UE or a UE group, i.e. the Home cell or the Private network from the system information. Since neither the UE nor UE group needs to share a radio link with other unspecified UEs in a public cell, a QoS guarantee is maximized for the UE or the UE group.

If the indicator indicates that the candidate cell is a Home cell or a Private network, the UE proceeds to step 311, where the UE compares a cell ID of the candidate cell with the stored accessible list. The accessible list is stored by hard coding in a memory such as a USIM in 3GPP system, or it is signaled from a higher network entity during a Tracking Area Update (TAU) procedure and then stored in the memory in the UE.

The comparison between the candidate cell with the accessible list is a determination whether the candidate cell is included in the accessible list, and more particularly, whether the ID of candidate cell is matched to a specific cell ID in the accessible list. If the candidate cell ID is unique only in a cell level, i.e., unique in a PLMN, the UE can check a pair of the candidate cell ID and the PLMN ID with the accessible list.

In the presence of the candidate cell ID in the accessible list, the UE determines that the candidate cell is the selectable (available) Home cell or Private network for the cell selection in step 321. Unless restricted by other information, the UE performs cell selection to the candidate cell as the Home cell or Private network.

However, in the absence of the candidate cell ID of the candidate cell in the accessible list, the UE determines that the candidate cell is not available to access to the Home cell or Private network in step 323.

If the indicator does not indicate that the candidate cell is the Home cell or the Private network in step 305, the UE performs cell selection in a conventional manner, considering the candidate cell to be a public cell in step 331.

Figure 4:
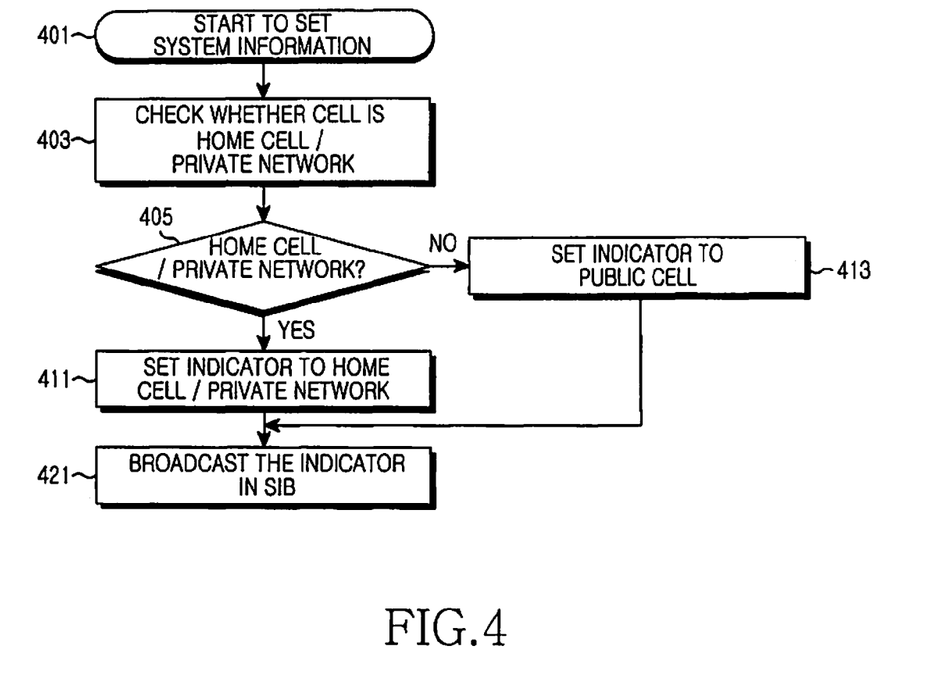
FIG. 4 is a flowchart of an operation of an ENB according to the first embodiment of the present invention.

FIG. 4 is a flowchart of an operation of an ENB according to the first embodiment of the present invention.

Referring to FIG. 4, the ENB sets system information to be broadcast to a specific cell managed by the ENB in step 401 and determines whether the cell is the Home cell or the Private network in step 403. The Home cell or the Private network can be set through Operations and Maintenance (O&M) or through signaling from a higher network entity. Thus, the ENB determines whether the cell is the set Home cell/Private network.

If the cell is the Home cell/Private network, the ENB sets an indicator to indicate a special cell that only a predetermined UE or UE group can access in the system information in step 411.

However, if the cell is not a special cell, the ENB sets the indicator to indicate a public cell (i.e., macro cell), and that it is not a special cell in the system information in step 413.

In step 421, the ENB broadcasts the set indicator in step 411 or step 413 in a System Information Block (SIB) to the cell.

Figure 5:
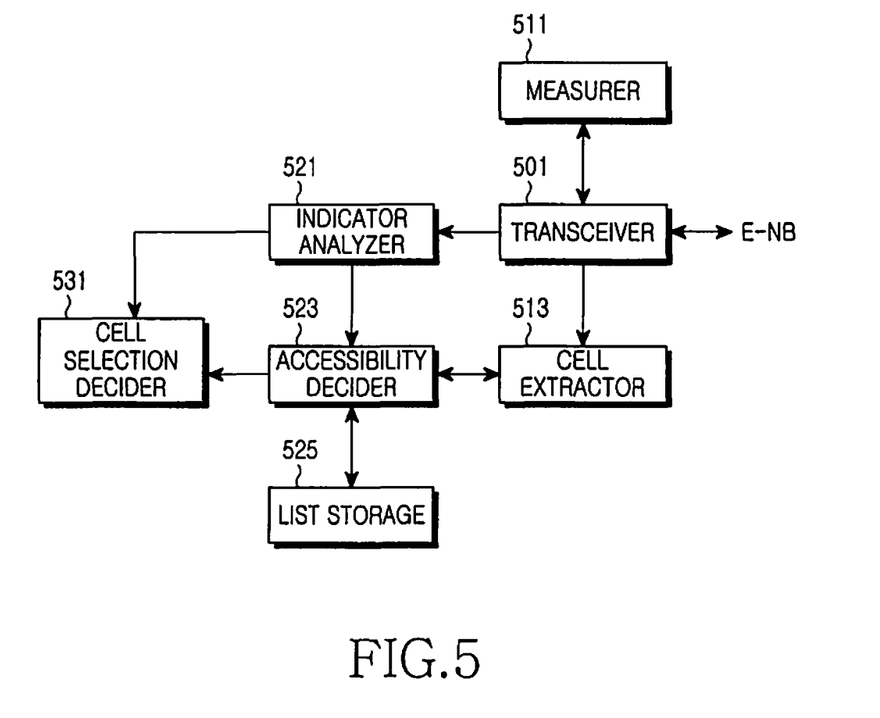
FIG. 5 is a block diagram of the UE according to the first embodiment of the present invention.

FIG. 5 is a block diagram of the UE according to the first embodiment of the present invention.

Referring to FIG. 5, a transceiver 501 receives a pilot signal for a measurement from a candidate cell or receives system information from a candidate cell for cell selection according to the result of the measurement.

A measurer 511 measures pilot signals received from the serving cell and neighbor cells of the UE through the transceiver 501 and determines the candidate cell for cell selection according to the measurement.

After the candidate cell is selected in the measurer 511, an indicator analyzer 521 checks the system information of the candidate cell received from the transceiver 501 and analyzes an indicator in the system information.

A cell extractor 513 extracts ID information for identifying the cell or ID information for estimating the mobility of the UE and stores the extracted ID information. For example, the ID information can be a cell ID, a PLMN ID or a Private network ID.

The indicator analyzer 521 determines whether the indicator indicates a Home cell or a Private network.

An accessibility decider 523 determines whether the cell ID extracted by the cell extractor 513 is included in a stored accessible list with information about accessible Home cells or Private networks stored in a list storage 525. The list storage 525 has already stored the accessible list in a USIM by hard coding, or has received the list from a predetermined higher network entity and stored it.

The result of the determination is provided as an input to a cell selection decider 531, for cell selection.

Meanwhile, if the indicator analyzer 521 determines that the candidate cell is not a Home cell or a Private network, the accessibility decider 523 does not need to determine whether the candidate cell is accessible through the cell extractor 513 and the list storage 525. Accordingly, the UE can determine in a conventional manner through the cell selection decider 531 whether the candidate cell is accessible. That is, the UE can perform cell selection according to the measurements of neighbor cells including the candidate cell, considering the candidate cell to be a public cell.

Figure 6:
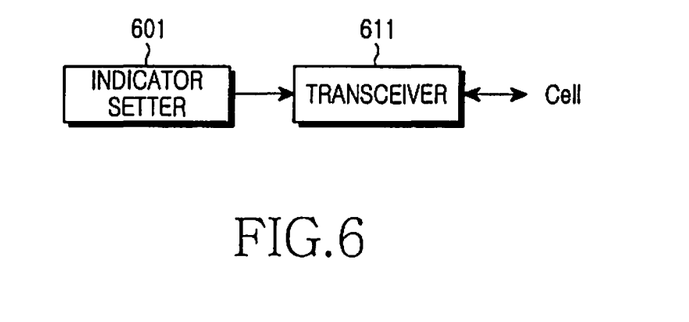
FIG. 6 is a block diagram of the ENB according to the first embodiment of the present invention.

FIG. 6 is a block diagram of the ENB according to the first embodiment of the present invention.

Referring to FIG. 6, an indicator setter 601 sets an indicator for a cell managed by the ENB by determining whether the cell is the Home cell or the Private network through Operations and Maintenance (O & M) or signaling from a higher network entity.

Hence, when the cell is the Home cell or Private network, the indicator setter 601 sets the indicator to indicate a Home cell or a Private network in system information. If the cell is not a Home cell or a Private network, the indicator setter 601 sets the indicator to a public cell in the system information. A transceiver 611 broadcasts the system information including the indicator to all UEs within the cell.

Embodiment 2

A second embodiment of the present invention provides a method for, if a neighbor cell included in a neighbor cell list broadcast from a serving cell is a Home cell or a Private network, enabling only UEs that can access the neighbor cell to perform cell selection to the neighbor cell in a mobile communication system. An offset by which to prioritize the neighbor cell is optionally allocated so that if the offset is not included in information about the neighbor cell in the neighbor cell list, the UE performs a measurement in a conventional manner, considering that the neighbor cell is not a Home cell or a Private network.

If the offset is included in the neighbor cell information of the neighbor cell list, the UE compares a cell ID of the neighbor cell with a stored accessible list including information about accessible Home cells or Private networks. In the absence of the neighbor cell in the accessible list, the UE deletes the neighbor cell from a measurement context, determining that the neighbor cell is not selectable. It can be further contemplated that the UE performs the measurement, neglecting the offset of the neighbor cell or applies the negative-signed value of the offset to the measurement of the neighbor cell, rather than only considering that the neighbor cell is not selectable.

However, if the neighbor cell is included in the accessible list, the UE applies the positive-signed value of the offset to the measurement of the neighbor cell, considering that the neighbor cell is an accessible Home cell or Private network, thus increasing the priority level of the neighbor cell for cell selection. The offset can be set to an infinite value.

The determination as to the presence or absence of the neighbor cell in the accessible list can be made by checking whether a PLMN selected by the UE is identical to a PLMN for which information is broadcast from the neighbor cell and the cell ID of the neighbor cell broadcast from the neighbor cell is included in the accessible list. If the cell ID is unique irrespective of the PLMN in the system, it may obviate the need for checking whether the selected PLMN is the PLMN of the neighbor cell.

Figure 7:
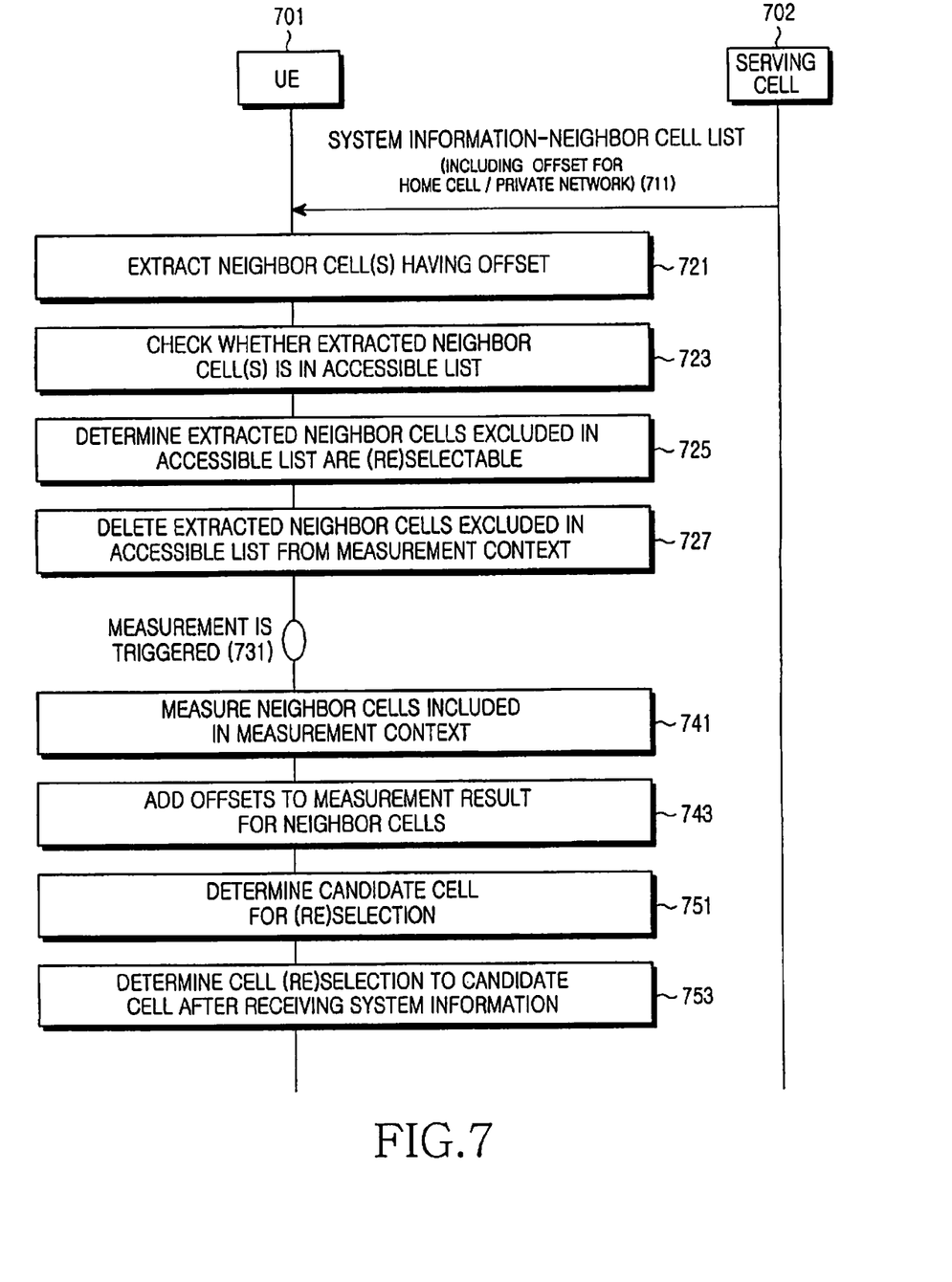
FIG. 7 illustrates a method for cell selecting to the Home cell or the Private network according to the second embodiment of the present invention.

FIG. 7 illustrates a method for selecting a cell, considering a Home cell or a Private network according to the second embodiment of the present invention. This cell selection method is suitable for a cell re-selection scenario in the case of movement of a UE.

Referring to FIG. 7, reference numeral 701 denotes a UE and reference numeral 702 denotes a serving cell for the UE 701.

In step 711, the serving cell 702 transmits a neighbor cell list to the UE 701 in system information. That is, the UE 701 receives the neighbor cell list for use in a measurement in the system information broadcast from the serving cell 702. The neighbor cell list includes information about cells to be measured and cell selection parameters associated with the cells, when the UE 701 needs to measure.

In the illustrated case of FIG. 7, the cell selection parameters include values from which information about the serving cell and a plurality of neighbor cells can be estimated, such as frequency information or a cell ID of each cell. That is, the neighbor cell list has cell selection-associated parameters, particularly the offset of a neighbor cell being a Home cell or a Private network. For example, the offset can be 3 db.

The offset functions to increase the priority level of the neighbor cell when a UE that can access the neighbor cell selects a candidate cell for cell selection as a result of the measurement. That is, when a plurality of UEs that can access the neighbor cell measure their neighbor cells, they add the offset of the neighbor cell to the measurement of the neighbor cell.

For instance, the neighbor cell list includes parameters about neighbor cell #1 to neighbor cell #8. If neighbor cell #6 is a Home cell or a Private network, the system information can be set as follows.

[Neighbor Cell List]
neighbor cell #1 information
neighbor cell #2 information
neighbor cell #3 information
neighbor cell #4 information
neighbor cell #5 information
neighbor cell #6 information: an offset for prioritizing neighbor cell #6
neighbor cell #7 information
neighbor cell #8 information In step 721, the UE 701 extracts one or more neighbor cells with offsets. In the above example, the UE 701 extracts neighbor cell #6.

The UE 701 determines whether the extracted neighbor cell (neighbor cell #6) exists in the accessible list including information about accessible Home cells or Private networks in step 723.

The accessible list is stored by hard coding in a memory such as a 3GPP USIM or signaled from a network entity during a TAU and stored. If the cell ID of the neighbor cell is unique only in a PLMN, the UE can compare a pair of the cell and the ID of the PLMN with the list in step 723.

The UE 701 deletes neighbor cells extracted in step 721 but not present in the accessible list from a measurement context. That is, the UE 701 considers these neighbor cells unselectable in steps 725 and 727, to thereby efficiently measure the remaining neighbor cells.

As the UE 701 moves and thus needs a measurement to ensure its mobility, it does not measure neighbor cells that satisfy the condition (i.e. having offsets) and that are not included in the accessible list by excluding the neighbor cells from the measurement. As a result, the measurement efficiency is increased. That is, the priority levels of the neighbor cells absent in the list in step 723 are decreased for cell selection because the neighbor cells are not accessible irrespective of their measurements. For example, if neighbor cell #6 is not included in the accessible list, the UE 701 does not need to measure neighbor cell #6.

In step 731, the UE 701 senses that a measurement has been triggered for neighbor cells. For example, if the radio strength of the serving cell drops below a threshold, the measurement can be triggered.

The UE 701 measures neighbor cells listed in the neighbor cell list in step 741. Herein, the UE 701 measures neighbor cells with offsets among the neighbor cells of the neighbor cell list in order to prioritize Home cells or Private networks. At the same time, the UE 701 may not measure neighbor cells absent in the stored accessible list.

The neighbor cells measured in step 741 are those with offsets extracted in step 721. For a neighbor cell included in the stored list, the UE 701 adds the offset of the neighbor cell to the measurement of the neighbor cell in step 743.

This is done to increase the probability of an accessible Home cell or Private network being selected as a candidate cell for cell selection. That is, the UE gives a higher priority level to the cell for which offset is added to its measurement during cell selection. The offset of each Home cell or Private network may be different, and can be set to an infinite value.

For a neighbor cell with an infinite offset, the UE 701 can select the neighbor cell immediately as a candidate cell for cell selection without measuring other neighbor cells and comparing their measurements.

In step 751, the UE 701 selects a candidate cell for cell selection according to the measurements of the neighbor cells. The UE 701 receives cell selection-associated system information from the candidate cell, analyzes the cell selection-associated system information, and finally determines whether the candidate cell is to be selected in step 753.

Figure 8A:
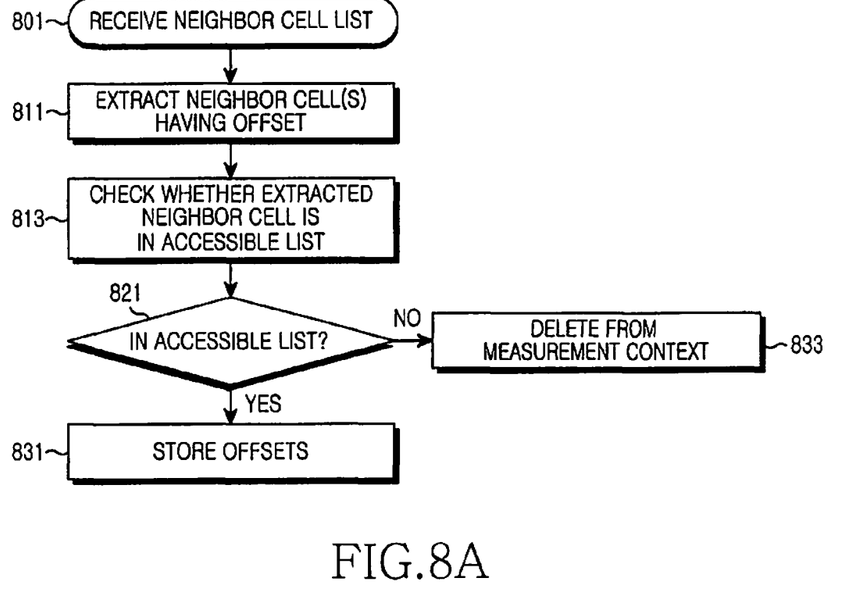
FIGS. 8A and 8B are flowcharts of an operation of the UE according to the second embodiment of the present invention.
Figure 8B:
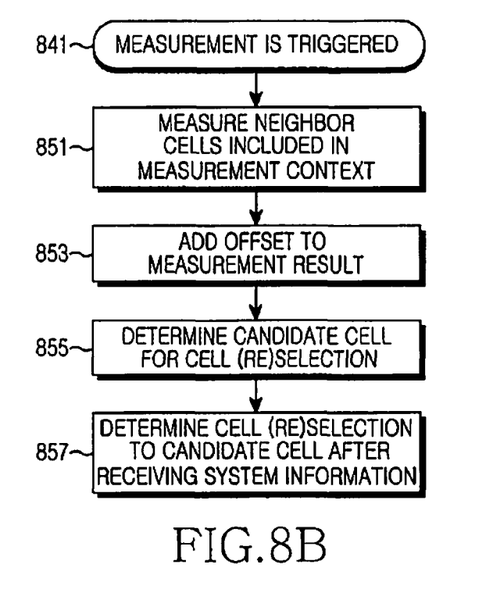

FIGS. 8A and 8B are flowcharts of an operation of the UE according to the second embodiment of the present invention.

Steps 801 to 833 of FIG. 8A concern an operation for receiving a neighbor cell list for a measurement in system information from a serving cell, and steps 841 to 857 of FIG. 8B concern a measurement operation based on the neighbor cell list.

Referring to FIG. 8A, the UE receives a neighbor cell list for use in a measurement from the serving cell in step 801.

In step 811, the UE extracts neighbor cells with offsets from the neighbor cell list. The offsets function to prioritize Home cells or Private networks, i.e. special cells accessible only to a predetermined UE or UE group, during cell selection.

In step 813, the UE checks whether the extracted neighbor cells are included in the stored accessible list with information about accessible Home cells or Private networks. The accessible list is stored by hard coding in a memory such as a 3GPP USIM, or it is signaled from a network entity during a TAU and then stored in the memory. If the cell IDs of the extracted neighbor cells are unique irrespective of PLMNs, the UE only has to check whether the cell IDs are included in the accessible list. If the cell IDs are unique only in PLMNs, the UE can check whether cell ID-PLMN ID pairs are included in the accessible list.

If an extracted neighbor cell is not included in the accessible list, the UE deletes the neighbor cell from a measurement context, considering that the neighbor cell is not selectable in step 833. That is, the neighbor cell is not measured when the measurement is triggered, to thereby ensure the efficiency of the measurement operation.

However, if the neighbor cell exists in the accessible list, the UE stores ID information or the cell ID of the neighbor cell and its offset in step 831.

FIG. 8B illustrates a measurement operation of the UE. In step 841, the UE senses that the measurement has been triggered for neighbor cells due to the mobility of the UE, for example.

The UE measures the neighbor cells determined to be measured in step 851. The UE may not measure neighbor cells that have offsets and that are not included in the accessible list, for example, the neighbor cells deleted from the measurement context in step 833.

Meanwhile, the UE measures the neighbor cells that have offsets, are present in the accessible list, and thus are stored in step 831.

In step 853, the UE adds the offsets of the measured neighbor cells to their measurements in order to prioritize Home cells or Private networks accessible to the UE, for candidate cell selection. The UE can select a neighbor cell with the largest measurement as a candidate cell, unless otherwise restricted. In step 855, the UE selects a candidate cell for cell selection from among the neighbor cells according to their measurement results.

In step 857, the UE receives cell selection-associated system information from the candidate cell and determines whether to select to the candidate cell.

Figure 9:
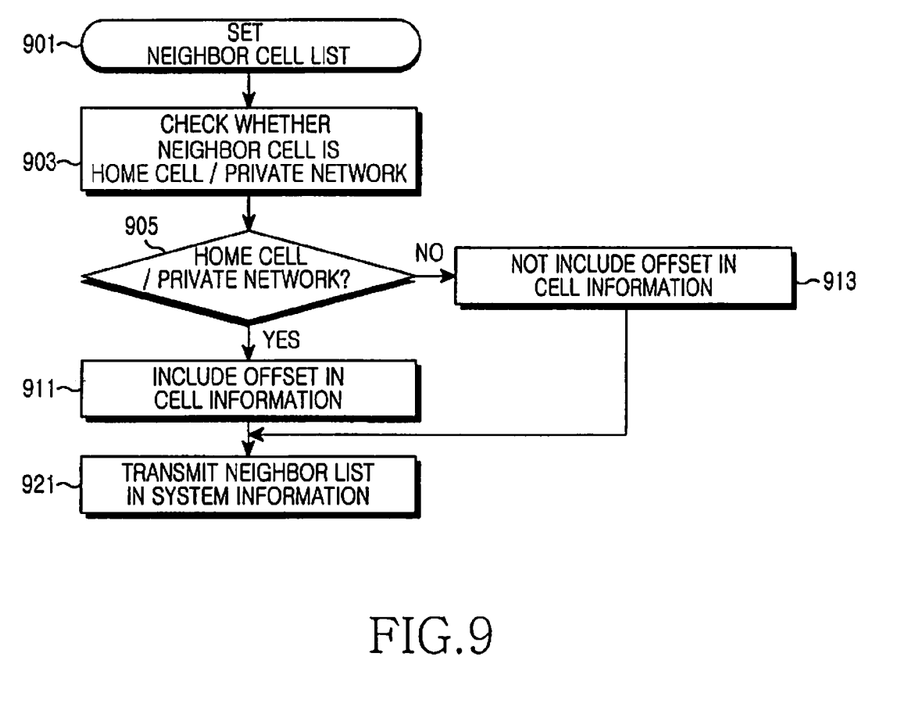
FIG. 9 is a flowchart of an operation of the ENB according to the second embodiment of the present invention.

FIG. 9 is a flowchart of an operation of the ENB according to the second embodiment of the present invention.

Referring to FIG. 9, the ENB sets a neighbor cell list for a cell managed by the ENB in step 901. The neighbor cell list can be broadcast in system information.

In step 903, the ENB determines whether a neighbor cell listed in the neighbor cell list is a Home cell or a Private network by O & M or through signaling from a higher network entity.

If the neighbor cell is a Home cell or a Private network in step 905, the ENB can explicitly or implicitly include an offset for the neighbor cell in the neighbor cell list in step 911. The offset is used for a UE to prioritize the neighbor cell for cell selection.

If the neighbor cell is not a Home cell or a Private network, the ENB does not include an offset for the neighbor cell in the neighbor cell list in step 913.

When the offset setting is completed for every neighbor cell listed in the neighbor cell list, the ENB broadcasts the neighbor cell list to the cell in the system information in step 921.

Figure 10:
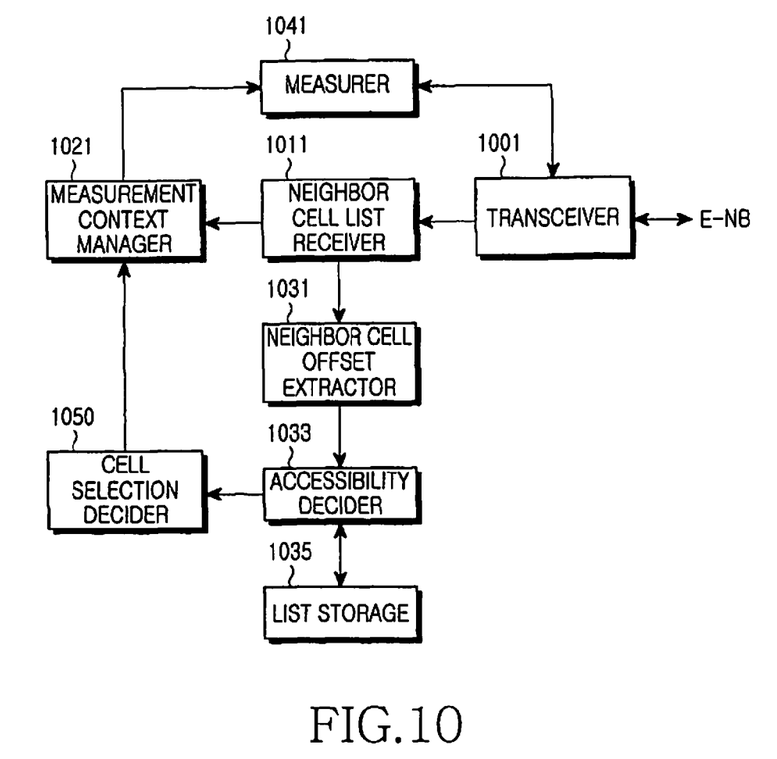
FIG. 10 is a block diagram of the UE according to the second embodiment of the present invention.

FIG. 10 is a block diagram of the UE according to the second embodiment of the present invention.

Referring to FIG. 10, a transceiver 1001 receives a pilot signal for a measurement, receives a neighbor cell list in system information from a serving cell, or receives system information from a candidate cell for cell selection according to the result of the measurement.

A neighbor cell list receiver 1011 checks the neighbor cell list in the system information received from the transceiver 1001.

A neighbor cell extractor 1031 extracts neighbor cells with offsets from the neighbor cell list so that the UE that can access the neighbor cells being Home cells or Private networks and prioritize them for cell selection using the offsets.

An accessibility decider 1033 determines whether the extracted neighbor cells are accessible using a stored accessible list including information about accessible Home cells or Private networks, stored in a list storage 1035. That is, the accessibility decider 1033 determines whether the extracted neighbor cells are included in the accessible list.

If the cell ID of an extracted neighbor cell is not included in the accessible list, a measurement context manager 1021 deletes the neighbor cell from a measurement context.

Meanwhile, if the cell ID of the extracted neighbor cell is included in the accessible list, a measurer 1041 measures the neighbor cell and adds its offset to its measurement in order to prioritize the neighbor cell, for selection of a Home cell or a Private network.

Therefore, a cell selection decider 1050 selects a candidate cell for cell selection according to the measurements received from the measurer 1041, analyzes cell selection-associated system information received from the candidate cell, and selects the candidate cell being a Home cell or a Private network unless otherwise restricted.

Figure 11:
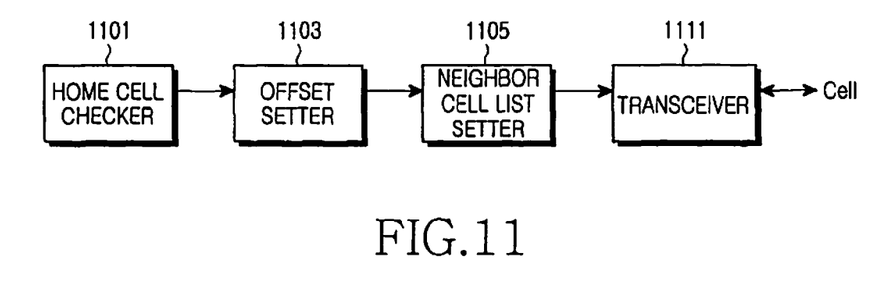
FIG. 11 is a block diagram of the ENB according to the second embodiment of the present invention.

FIG. 11 is a block diagram of the ENB according to the second embodiment of the present invention.

Referring to FIG. 11, a Home cell checker 1101 determines whether a neighbor cell listed in a neighbor cell list that a cell will transmit in system information is a special cell being a Home cell or a Private network accessible to a predetermined UE or UE group.

If the neighbor cell is a special cell, an offset setter 1103 sets an offset for the neighbor cell to increase the probability of the neighbor cell being selected for a UE that can access the neighbor cell.

If for every neighbor cell listed in the neighbor cell list, the Home cell checker 1101 completes the determination as to whether the neighbor cell can operate as a Home cell or a Private network and the offset setter 1103 completes offset setting for neighbor cells being Home cells or Private networks, a neighbor cell list setter 1105 completes formation of the neighbor cell list.

A transceiver 1111 broadcasts the neighbor cell list to all UEs within the cell in system information.

As is apparent from the above description, a UE compares cell ID information of a target cell received in system information with a stored accessible list including information about Home cells or Private networks and selects a Home cell or a Private network accessible to a predetermined UE or UE group as a candidate cell, for cell selection. Therefore, the UE receives a differentiated service that is dedicated to the UE or UE group.

The UE compares the list with neighbor cells having offsets in a neighbor cell list received in system information from a serving cell and selects a neighbor cell as a candidate cell for cell selection. As the measurements of the neighbor cells are prioritized using the offsets, the reliability and efficiency of the measurement are increased.

Further, since the UE deletes neighbor cells with a low probability of operating as Home cells or Private networks from a measurement context, the measurement process is simplified. That is, the UE deletes the neighbor cells from a measurement context and thus the measurement efficiency is maximized.

Also, higher priority levels are given to neighbor cells with a high probability of operating as Home cells or Private networks. Hence, the reliability of cell selection after the measurement is ensured.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for performing cell selection to a Closed Subscriber Group (CSG) cell by a User Equipment (UE) in a mobile communication system, comprising:
   receiving, by the UE, information about a neighbor cell list and information about the CSG cell, from a serving cell;
   performing, by the UE, measurement for at least one neighbor cell based on the information about the neighbor cell list;
   determining, by the UE, a candidate cell based on the measurement;
   receiving an indicator indicating information related to the CSG cell, and a CSG IDentification (ID), from the candidate cell; and
   selecting, by the UE, the candidate cell if the indicator indicates that the UE is accessible to the CSG cell, and the CSG ID is included in a CSG list.

2. The method of claim 1, wherein the neighbor cell list further comprises at least one offset value corresponding to at least one neighboring cell,
   the offset value being used for determining the candidate cell based on the measurement.

3. The method of claim 2, further comprising extracting the neighbor cell from the neighbor cell list, based on the offset value.

4. The method of claim 3, wherein a priority level of the extracted neighbor cell is decreased if the extracted neighbor cell is not included in the CSG list.

5. The method of claim 3, further comprising determining whether the CSG ID of the extracted neighbor cell is included in the CSG list.

6. The method of claim 1, further comprising receiving Public Land Mobile Network (PLMN) information from the candidate cell.

7. The method of claim 6, further comprising selecting the candidate cell, if the candidate cell belongs to a registered or selected PLMN.

8. The method of claim 1, wherein the CSG list is stored in a Universal Subscriber Identity Module (USIM) of the UE.

9. The method of claim 1, wherein the indicator indicates that the UE is accessible to the CSG cell, if the CSG ID is included in the CSG list in the UE.

10. The method of claim 1, wherein the CSG list is signaled to the UE from a higher network.

11. The method of claim 1, wherein the CSG ID and the indicator indicating the information related to the CSG cell are received in system information from the candidate cell.

12. The method of claim 1, further comprising identifying the candidate cell as a candidate that cannot be selected, if the CSG ID is not included in the CSG list.

13. An apparatus for performing cell selection to a Closed Subscriber Group (CSG) cell by a User Equipment (UE) in a mobile communication system, comprising:
a receiver which receives information about a neighbor cell list and information about the CSG cell, from a serving cell, and receives an indicator indicating information related to the CSG cell, and a CSG IDentification (ID), from a candidate cell; and
a controller which performs measurement for at least one neighbor cell based on the information about the neighbor cell list, determines the candidate cell based on the measurement, and selects the candidate cell if the indicator indicates that the UE is accessible to the CSG cell, and the CSG ID is included in a CSG list.

14. The apparatus of claim 13, wherein the neighbor cell list further comprises at least one offset value corresponding to at least one neighboring cell, the offset value being used for determining the candidate cell based on the measurement.

15. The apparatus of claim 14, wherein the controller extracts the neighbor cell from the neighbor cell list based on the offset value.

16. The apparatus of claim 15, wherein the controller decreases a priority level of the extracted neighbor cell if the extracted neighbor cell is not included in the CSG list.

17. The apparatus of claim 15, wherein the controller determines whether the CSG ID of the extracted neighbor cell is included in the CSG list.

18. The apparatus of claim 13, wherein the receiver receives Public Land Mobile Network (PLMN) information from the candidate cell.

19. The apparatus of claim 18, wherein the controller selects the candidate cell, if the candidate cell belongs to a registered or selected PLMN.

20. The apparatus of claim 13, wherein the CSG list is stored in a Universal Subscriber Identity Module (USIM) of the UE.

21. The apparatus of claim 13, wherein the indicator indicates that the UE is accessible to the CSG cell, if the CSG ID is included in the CSG list in the UE.

22. The apparatus of claim 13, wherein the CSG list is signaled to the UE from a higher network.

23. The apparatus of claim 13, wherein the CSG ID and the indicator indicating the information related to the CSG cell are received in system information from the candidate cell.

24. The apparatus of claim 13, wherein the controller identifies the candidate cell as a candidate that cannot be selected, if the CSG ID is not included in the CSG list.

25. A method for servicing a Closed Subscriber Group (CSG) cell in a Node B in a mobile communication system, comprising:
setting, by the Node B, information about a neighbor cell list and information about the CSG cell, an indicator indicating information related to the CSG cell, and a CSG IDentification (ID) in system information; and
broadcasting, by the Node B, the information about the neighbor cell list and information about the CSG cell, the indicator indicating information related to the CSG cell, and the CSG ID in the system information, to a User Equipment (UE).

26. The method of claim 25, wherein the neighbor cell list comprises at least one offset value corresponding to at least one neighboring cell, the offset value being used for determining a candidate cell.

27. The method of claim 25, wherein the indicator indicates that the UE is accessible to the CSG cell, if the CSG ID is included in a CSG list in the UE.

28. The method of claim 27, wherein the CSG list is signaled to the UE from a higher network.

29. An apparatus of a Node B for servicing a Closed Subscriber Group (CSG) cell in a mobile communication system, comprising:
a setter which sets information about a neighbor cell list and information about the CSG cell, an indicator indicating information related to the CSG cell, and a CSG IDentification (ID) in system information; and
a transceiver which broadcasts the information about the neighbor cell list and information about the CSG cell, the indicator indicating information related to the CSG cell, and the CSG ID in the system information, to a User Equipment (UE).

30. The apparatus of claim 29, wherein the neighbor cell list comprises at least one offset value corresponding to at least one neighboring cell, the offset value being used for determining a candidate cell.

31. The apparatus of claim 29, wherein the indicator indicates that the UE is accessible to the CSG cell, if the CSG ID is included in a CSG list in the UE.

32. The apparatus of claim 31, wherein the CSG list is signaled to the UE from a higher network.

* * * * *